(12) United States Patent
Denny et al.

(10) Patent No.: US 6,938,785 B2
(45) Date of Patent: Sep. 6, 2005

(54) METHODS AND APPARATUS FOR ANCHORING A RETRACTABLE NETTING SYSTEM

(75) Inventors: David S. Denny, Middle Haddam, CT (US); Edward T. Mehl, Windsor, CT (US); Maurice A. Russo, Storrs, CT (US)

(73) Assignee: Sinco, Inc., Middletown, CT (US)

( * ) Notice: Subject to any disclaimer, the term of this patent is extended or adjusted under 35 U.S.C. 154(b) by 2 days.

(21) Appl. No.: 10/423,810

(22) Filed: Apr. 25, 2003

(65) Prior Publication Data

US 2004/0211740 A1 Oct. 28, 2004

(51) Int. Cl.[7] .................................................. A47F 5/00
(52) U.S. Cl. ..................................................... 211/183
(58) Field of Search ................................ 211/183, 180, 211/191, 187, 84; 160/84.06, 279

(56) References Cited

U.S. PATENT DOCUMENTS

| | | | |
|---|---|---|---|
| 149,770 A | * 4/1874 | May | 160/84.06 |
| 4,981,225 A | 1/1991 | Cole | 211/183 |
| 5,170,829 A | 12/1992 | Duncan et al. | 160/84.1 |
| 5,573,125 A | 11/1996 | Denny | 211/183 |
| 5,984,121 A | * 11/1999 | Cole | 211/183 |
| 6,585,122 B2 | 7/2003 | Calleja | 211/183 |
| 6,609,621 B2 | * 8/2003 | Denny et al. | 211/189 |
| 6,619,490 B2 | * 9/2003 | Calleja | 211/183 |
| 6,698,604 B2 | * 3/2004 | Denny et al. | 211/189 |
| 6,722,512 B2 | * 4/2004 | Scully | 211/183 |
| 6,805,187 B2 | * 10/2004 | Padiak et al. | 160/330 |
| 2002/0148799 A1 | 10/2002 | Denny et al. | |

OTHER PUBLICATIONS

B&O Manufacturing, Inc., Net Install Instruction, Jan. 22, 2002, San Francisco, CA.
B&O Manufacturing, Inc., Net, Safety, Front Mount, System, May 10, 2002, San Francisco, CA.
B&O Manufacturing, Inc., Net, System, Insert Mount, V Rack, Fan, May 10, 2002, San Francisco, CA.
B&O Manufacturing, Inc., Net, Safety, Insert, System, Aug. 31, 2001, San Francisco, CA.

* cited by examiner

Primary Examiner—David Purol
(74) Attorney, Agent, or Firm—IPLM Group, P.A.

(57) ABSTRACT

The present invention relates to methods and apparatus for anchoring a retractable netting system in a vertical orientation relative to a shelving assembly. A retractable netting system includes a frame assembly onto which a net is operatively connected. Cables attached to opposing ends of a draw bar member may be pulled and released to raise and lower the net.

25 Claims, 18 Drawing Sheets

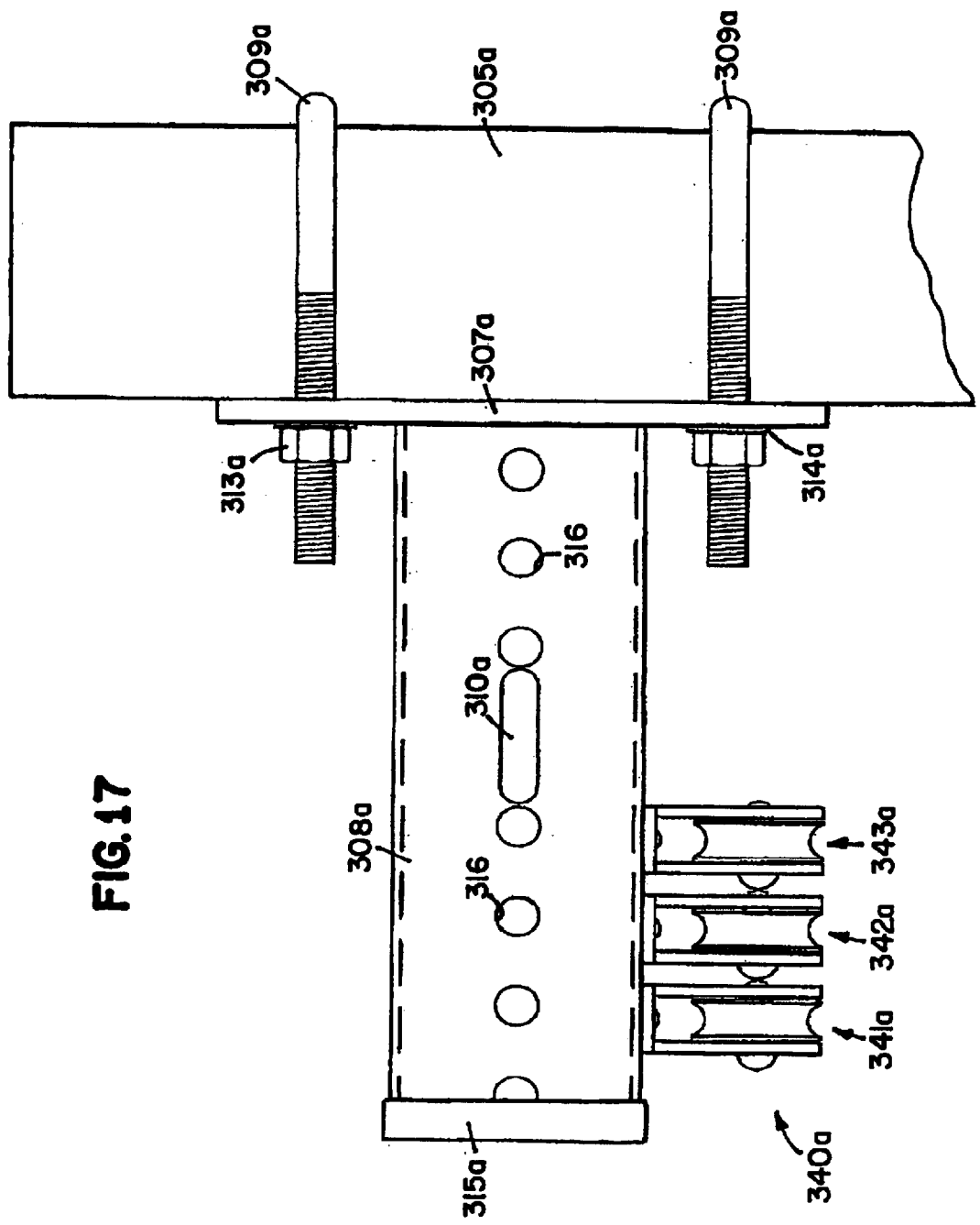

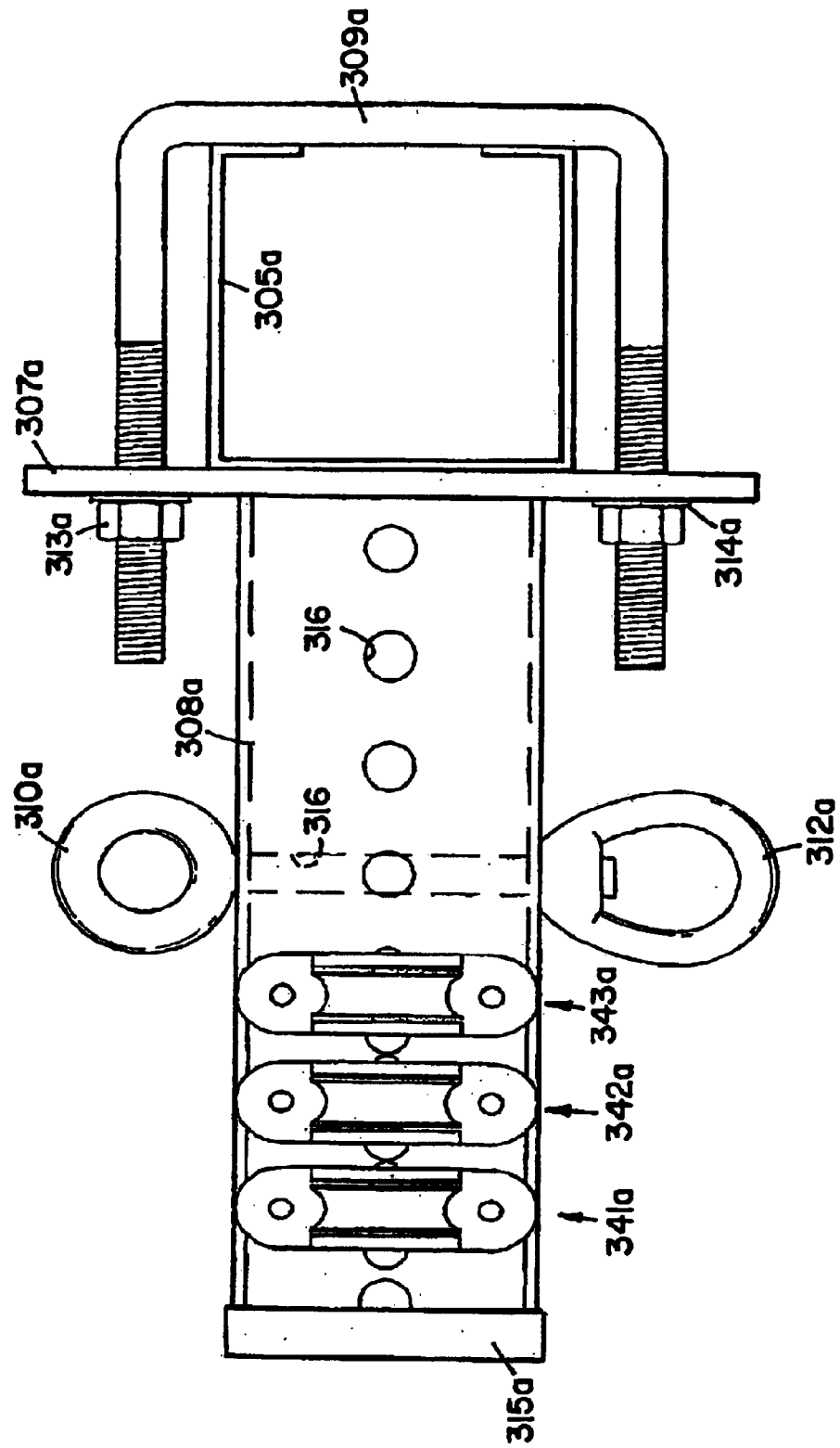

METHODS AND APPARATUS FOR ANCHORING A RETRACTABLE NETTING SYSTEM

FIELD OF THE INVENTION

The present invention relates to methods and apparatus for anchoring a retractable netting system in a vertical orientation relative to a shelving assembly.

BACKGROUND OF THE INVENTION

Among other things, a netting system may be used as a barrier across the front of a shelving assembly to prevent items on the shelves from falling. Ideally, such an arrangement should be relatively inexpensive to manufacture, easy to install, and reliable in use. Also, convenient access to the items on the shelves may be desired, in which case, the netting should be readily movable into and out of its "barrier" position relative to the shelves. Moreover, it may be desirable to provide such a barrier across a shelf space or bay that extends upward beyond the shelf supporting structure.

SUMMARY OF THE INVENTION

In a preferred embodiment retractable netting system for use with a shelving assembly, the shelving assembly has a plurality of vertical shelf posts and horizontal shelf supports configured and arranged to define at least one bay. A net is configured and arranged to span the at least one bay. A plurality of brackets is operatively connected to at least two of the plurality of vertical shelf posts. A frame assembly includes a first cable and a draw bar member. The first cable is operatively connected to the plurality of brackets, and the draw bar member is slidably connected to the first cable. The net is operatively connected to the first cable and a bottom portion of the net is operatively connected to the draw bar member. A second cable is operatively connected to a first end of the draw bar member and at least one bracket, and a third cable is operatively connected to a second end of the draw bar member and at least one bracket. A pull cable is operatively connected to the second cable and the third cable, wherein pulling the pull cable raises the draw bar member thereby raising the net and releasing the pull cable lowers the draw bar member thereby lowering the net.

In a preferred embodiment storage assembly, a plurality of vertical shelf posts and horizontal shelf supports are configured and arranged to define at least one shelf space having a length measured perpendicular to said shelf posts. A side has a post at each end, and each post has a top and a bottom. A net is sized to span the shelf length, and the net has four sides. A bracket is operatively connected to each post on the side proximate the top and proximate the bottom of each post. A first cable is operatively connected to each bracket and interconnects the brackets. The first cable defines a three-sided frame onto which three sides of the net are operatively connected. A draw bar member is slidably connected to the first cable, and the fourth side of the net is operatively connected to the draw bar member. A second cable is operatively connected to a first end of the draw bar member and at least one bracket. A third cable is operatively connected to a second end of the draw bar member and at least one bracket. A pull cable interconnects the second cable and the third cable, wherein pulling the pull cable raises the draw bar member and releasing the pull cable lowers the draw bar member thereby raising and lowering the net.

In a preferred embodiment retractable netting system for use with a shelving assembly, the shelving assembly has a plurality of vertical shelf posts and horizontal shelf supports configured and arranged to define at least one bay and at least one side, and each post has a top and a bottom. A net is configured and arranged to span the at least one bay. A first bracket is operatively connected to each post on the at least one side proximate the top of each post, and a second bracket is operatively connected to each post on the at least one side a distance from said first bracket. A frame assembly is operatively connected to the posts on the at least one side. A first cable is operatively connected to the frame assembly proximate a first side, and the first cable is operatively connected to the first bracket on the first side of the frame assembly. A second cable is operatively connected to the frame assembly proximate a second side, and the second cable is operatively connected to the first bracket on the second side of the frame assembly.

In a preferred embodiment retractable netting system for use with a shelving assembly, the shelving assembly has a plurality of vertical shelf posts and horizontal shelf supports configured and arranged to define at least one bay. A net is configured and arranged to span the at least one bay, and a plurality of brackets is operatively connected to at least two of the plurality of vertical shelf posts. A frame assembly includes a first cable operatively connected to the plurality of brackets, and the net is operatively connected to the first cable. A second cable is operatively connected to the net and at least one bracket, wherein pulling the second cable raises the net and releasing the second cable lowers the net.

In a preferred embodiment method for anchoring a retractable netting system, a plurality of brackets is fastened onto vertical shelf posts of a shelving assembly. A frame assembly is operatively connected to the plurality of brackets, and the frame assembly includes a first cable and a draw bar member. The draw bar member is slidably connected to the first cable. A net is fastened onto the frame assembly. A second cable is operatively connected to an end of the draw bar member, and a third cable is operatively connected to an opposing end of the draw bar member. The second cable and the third cable are interconnected to create a pull cable.

BRIEF DESCRIPTION OF THE DRAWINGS

FIG. 17 is a right side view of the bracket assembly shown in FIG. 16; and

FIG. 18 is a bottom view of the bracket assembly shown in FIG. 16.

DETAILED DESCRIPTION OF A PREFERRED EMBODIMENT

Figure 1:
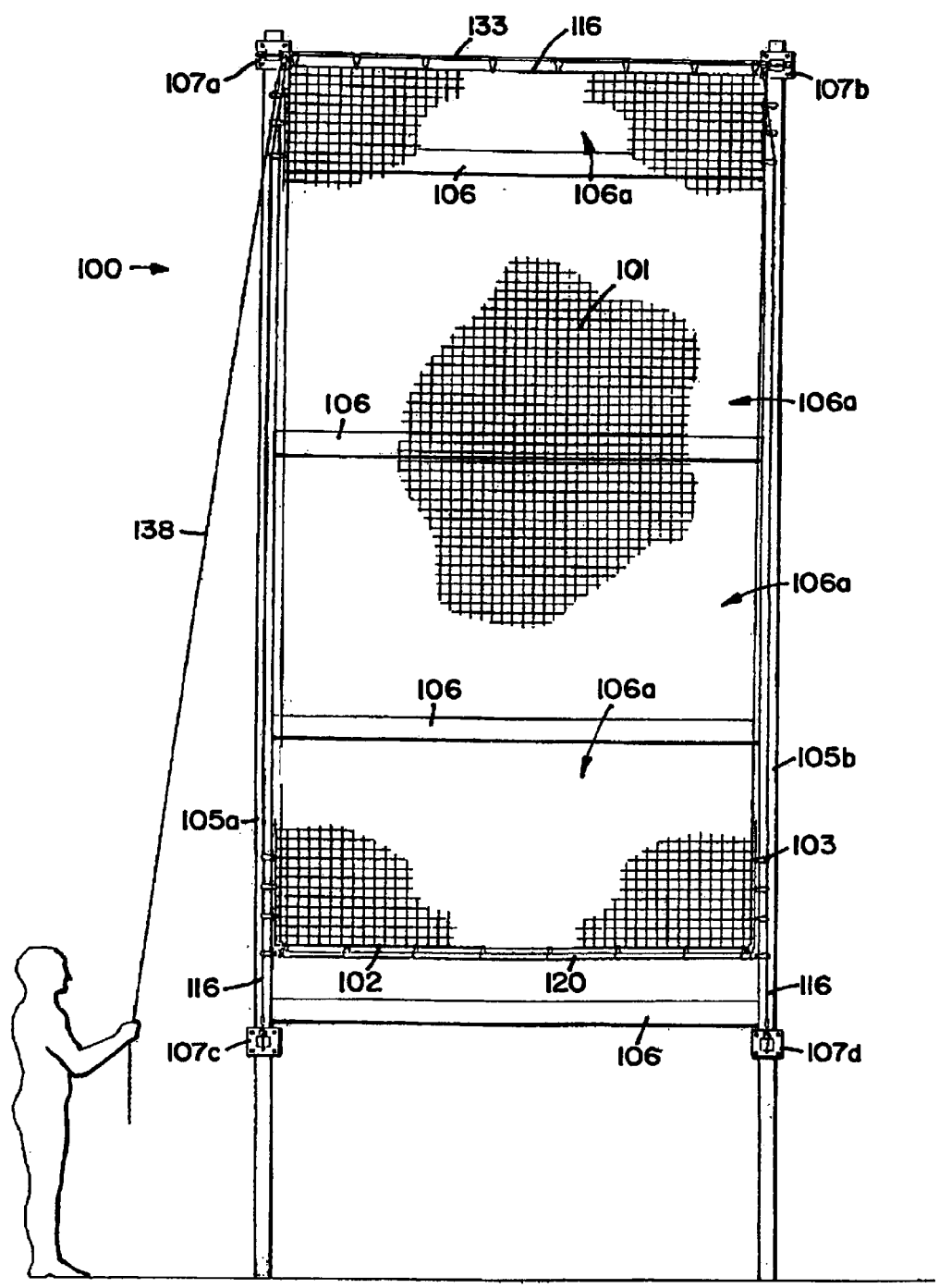
FIG. 1 is a front view of a retractable netting system for use with a shelving assembly constructed according to the principles of the present invention.
Figure 11:
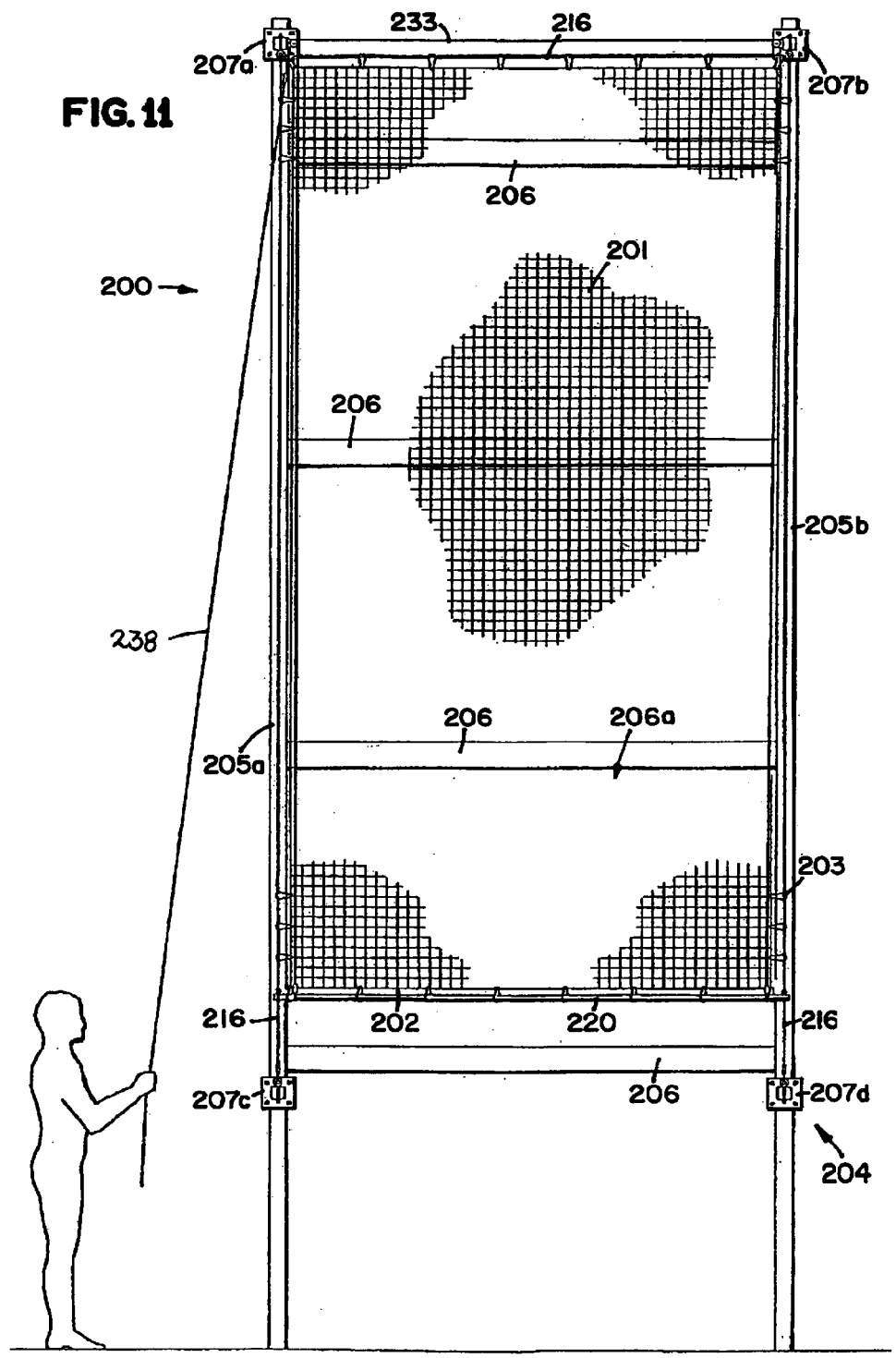
FIG. 11 is a front view of another embodiment retractable netting system for use with a shelving assembly constructed according to the principles of the present invention.

A preferred embodiment retractable netting system for use with a shelving assembly constructed according to the principles of the present invention is designated by the numeral 100 in FIG. 1 and by the numeral 200 in FIG. 11.

As shown in FIG. 1, the retractable netting system 100 is for use with a shelving assembly 104 having a first post 105a, a second post 105b, and shelves 106. The third and fourth posts are not shown. The four vertical posts support the shelves 106 in a horizontal orientation relative to the posts, and the shelves 106 support items stored thereon. The storage areas defined by the shelves 106 are termed bays 106a. In other words, items are stored on the shelves 106 within the bays 106a. Because of the risk that the items stored on the shelves 106 could fall and cause serious injury or even death, the netting system 100 is configured and arranged to prevent the items from falling off the shelves 106. The netting system 100 may span any or all of the four sides of the shelving assembly 104 in a vertical orientation relative to the shelving assembly 104. FIG. 1 shows the netting system 100 on one side of the shelving assembly 104, but again, it is recognized that the netting system 100 may be on any or all of the four sides of the shelving assembly 104. In addition, the netting system 100 may span any or all of the bays 106a of the shelving assembly 104. However, it is recognized that it is particularly important for the netting system 100 to span the upper bays 106a to more effectively prevent injury or death from falling items.

The netting system 100 includes netting 101 with a reinforced perimeter 102. Generally, the netting 101 is operatively connected to a frame assembly with hooks 103, and the frame assembly is operatively connected to the posts 105a and 105b. The netting system 100 also includes brackets operatively connected to the posts 105a and 105b at each corner of the netting system.

Figure 2:
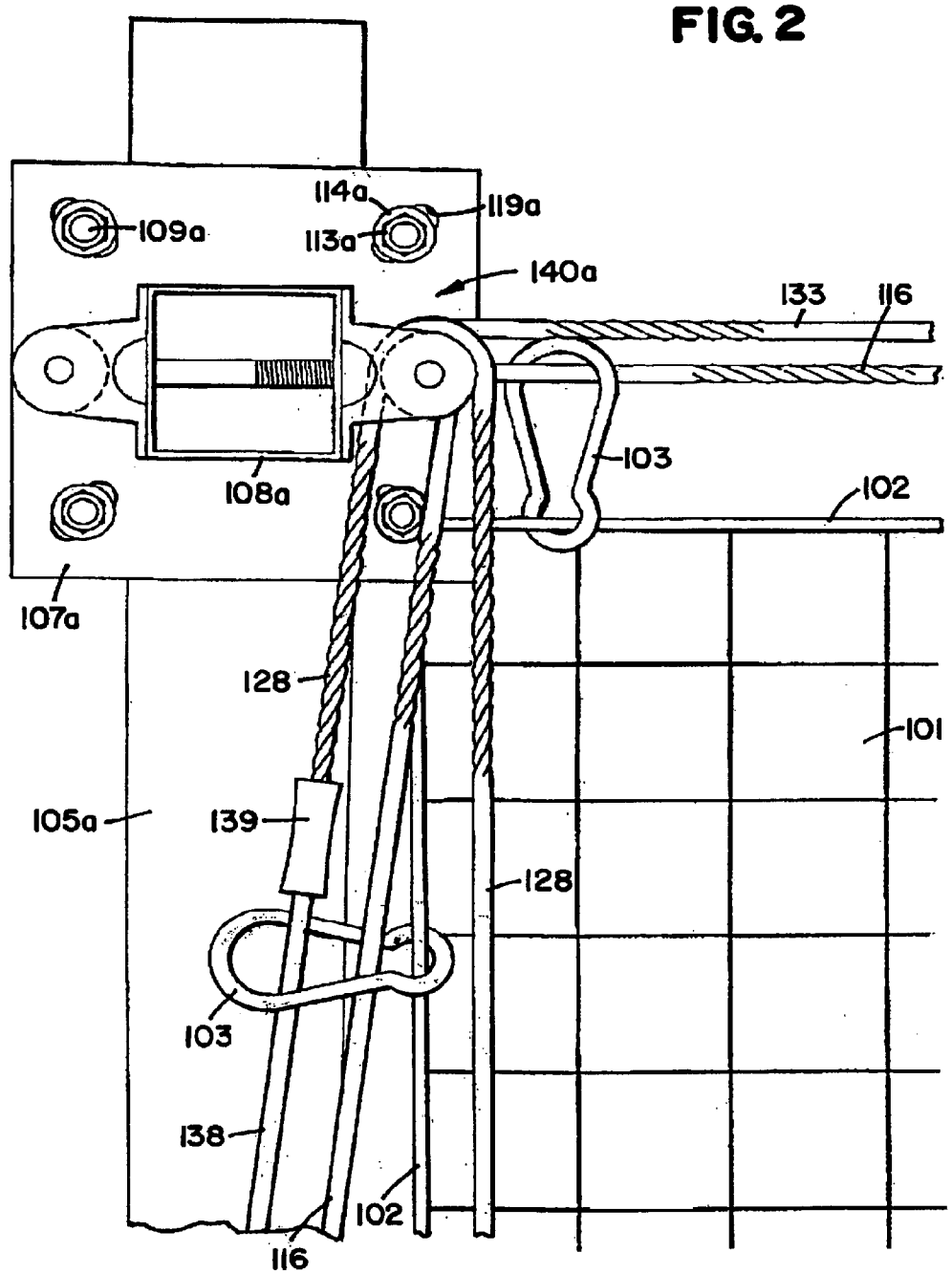
FIG. 2 is an upper left offset composite view of the retractable netting system shown in FIG. 1.
Figure 6:
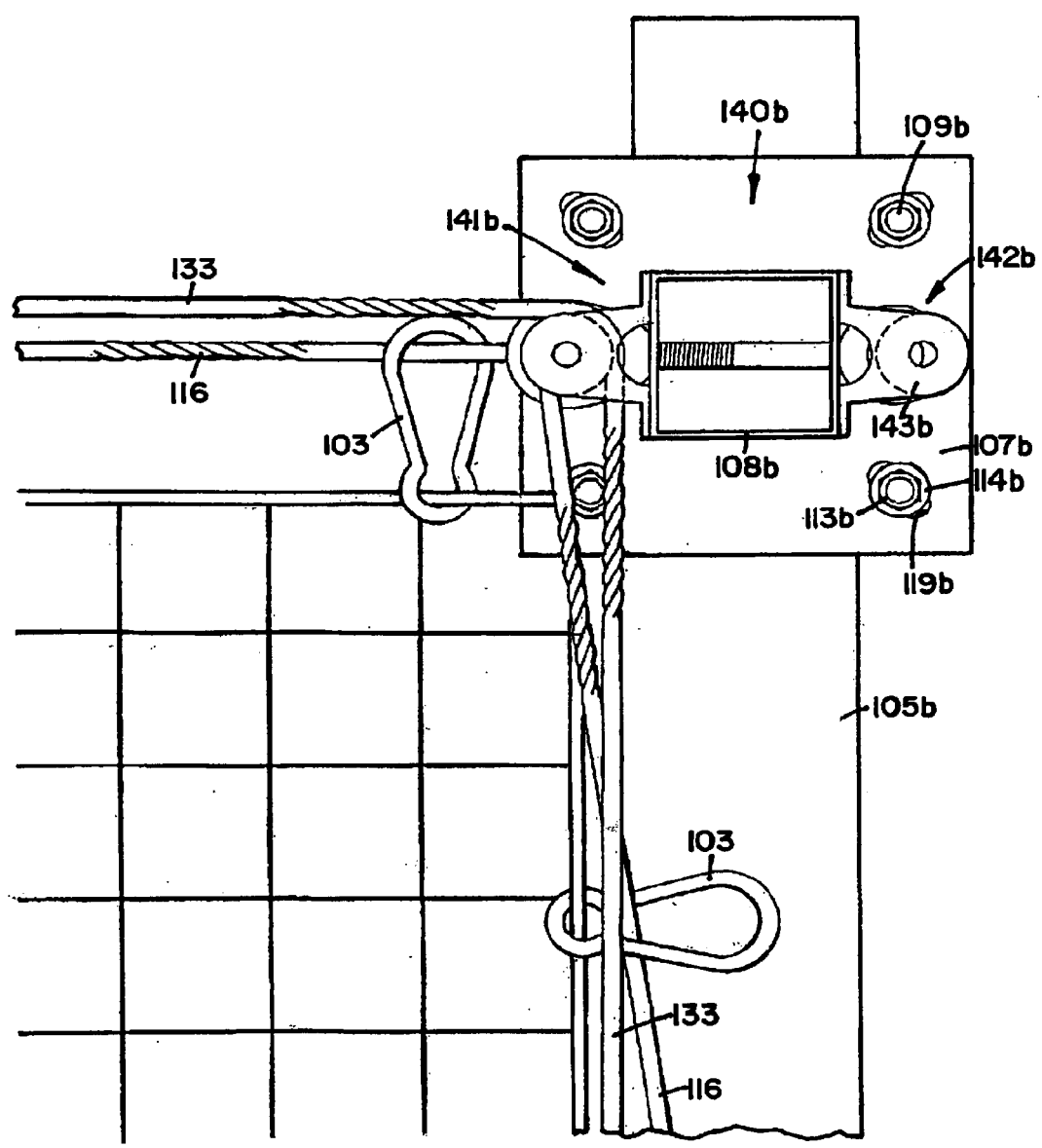
FIG. 6 is an upper right offset composite view of the retractable netting system shown in FIG. 1.
Figure 9:
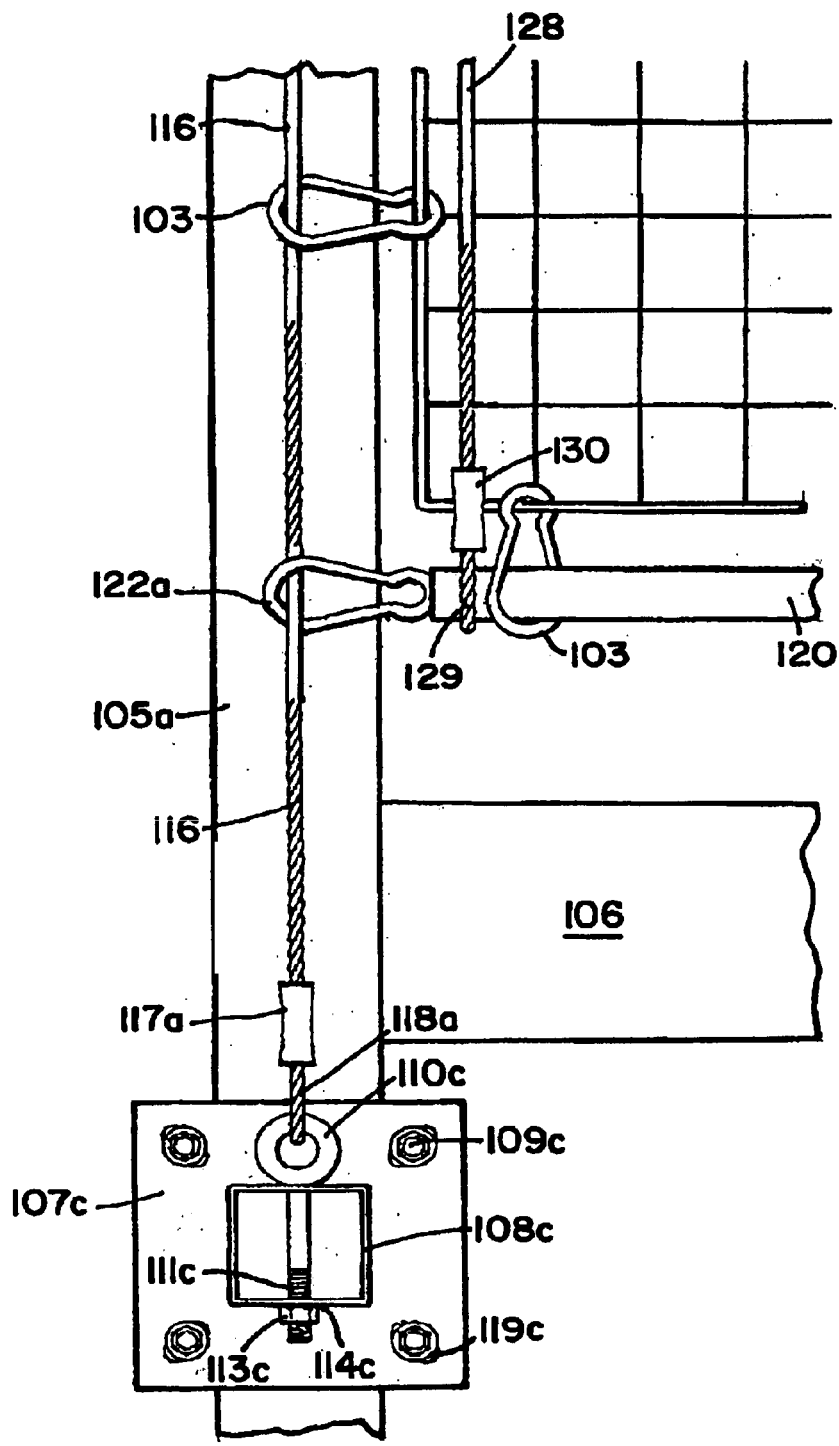
FIG. 9 is a lower left offset view of the retractable netting system shown in FIG. 1.
Figure 10:
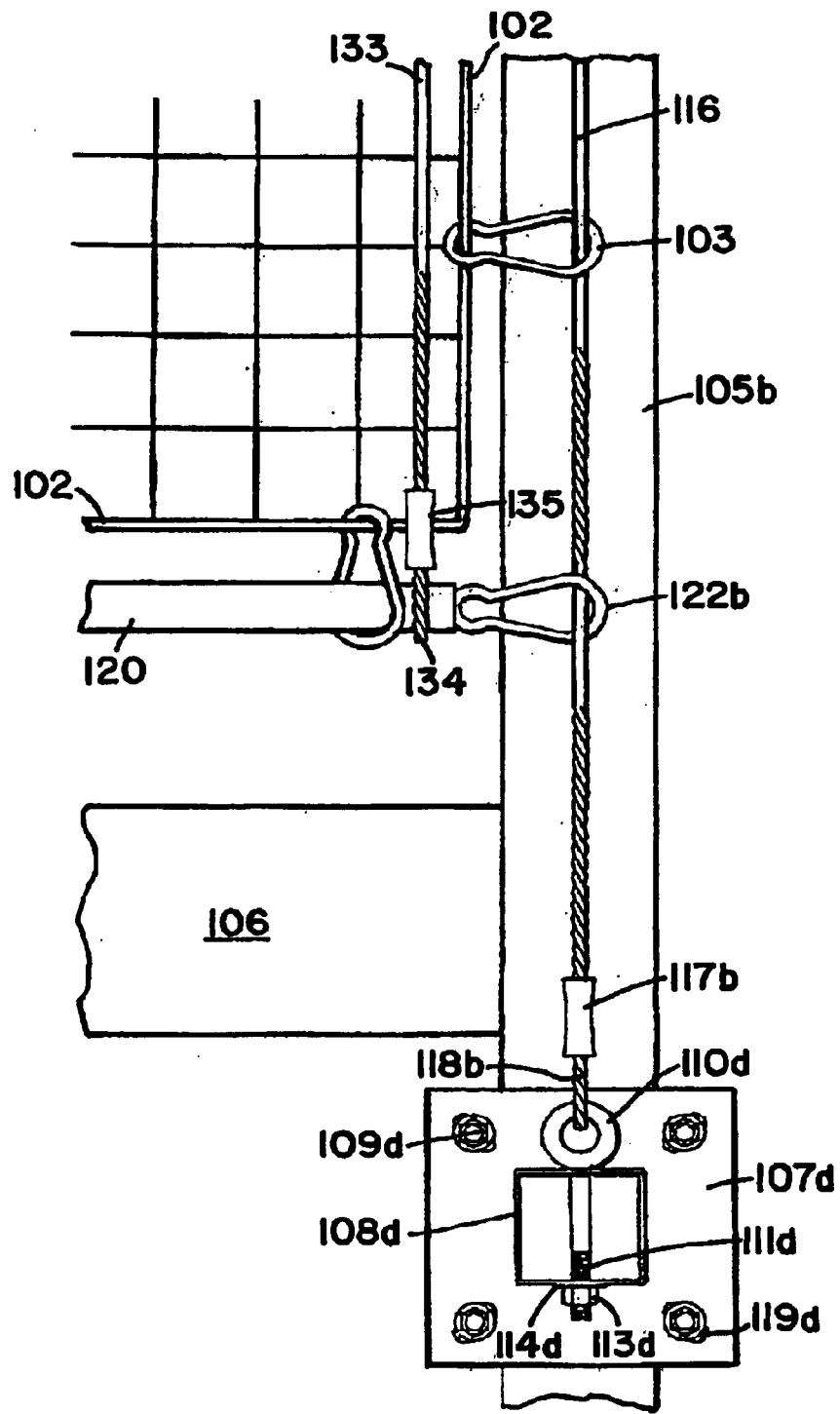
FIG. 10 is a lower right offset view of the retractable netting system shown in FIG. 1.

A first plate bracket 107a having a first mounting surface 108a is located proximate the upper left corner, as shown in FIG. 2. A second plate bracket 107b having a second mounting surface 108b is located proximate the upper right corner, as shown in FIG. 6. A third plate bracket 107c having a third mounting surface 108c is located proximate the lower left corner, as shown in FIG. 9. A fourth plate bracket 107d having a fourth mounting surface 108d is located proximate the lower right corner, as shown in FIG. 10. The brackets 107a–d each include a plate with four apertures or slots 119a–d proximate each corner and the mounting surfaces 108a–d extend proximate the middle of the plate, respectively. In the preferred embodiment, the mounting surfaces 108a–d are square tubes extending perpendicular from the plates and are welded onto the plates. The mounting surfaces 108a–d have cooperating apertures in at least one pair of opposing sides or walls. Therefore, a bolt may be inserted through the opposing, cooperating apertures parallel with the plates of the brackets 107a–d and fastened thereon with a nut. It is recognized that the mounting surfaces are not limited to being square tubes but may be cylindrical tubes, flanges, or other suitable mounting means extending from the plates.

The brackets 107a–d are connected to the posts 105a–b with U-bolts 109a–d. The U-bolts 109a–d are U-shaped and include threads at each end. Each end is secured with a washer and a hex-nut. A first U-bolt 109a cooperates with the post 105a proximate the top of the bracket 107a, extends around the post 105a and through the top two apertures 119a in the bracket 107a, and is fastened thereon with a washer 114a and a hex-nut 113a at each end. Similarly, another first U-bolt 109a cooperates with the post 105a proximate the bottom of the bracket 107a and is similarly fastened thereon. A second U-bolt 109b cooperates with the post 105b proximate the top of the bracket 107b, extends around the post 105b and through the top two apertures 119b in the bracket 107b, and is fastened thereon with a washer 114b and a hex-nut 113b at each end. Similarly, another second U-bolt 109b cooperates with the post 105b proximate the bottom of the bracket 107b and is similarly fastened thereon. A third U-bolt 109c cooperates with the post 105a proximate the top of the bracket 107c, extends around the post 105a and through the top two apertures 119c in the bracket 107c, and is fastened thereon with a washer and a hex-nut at each end. Similarly, another third U-bolt 109c cooperates with the post 105a proximate the bottom of the bracket 107c and is similarly fastened thereon. A fourth U-bolt 109d cooperates with the post 105b proximate the top of the bracket 107d, extends around the post 105b and through the top two apertures 119d in the bracket 107d, and is fastened thereon with a washer and a hex-nut at each end. Similarly, another fourth U-bolt 109d cooperates with the post 105b proximate the bottom of the bracket 107d and is similarly fastened thereon.

Figure 3:
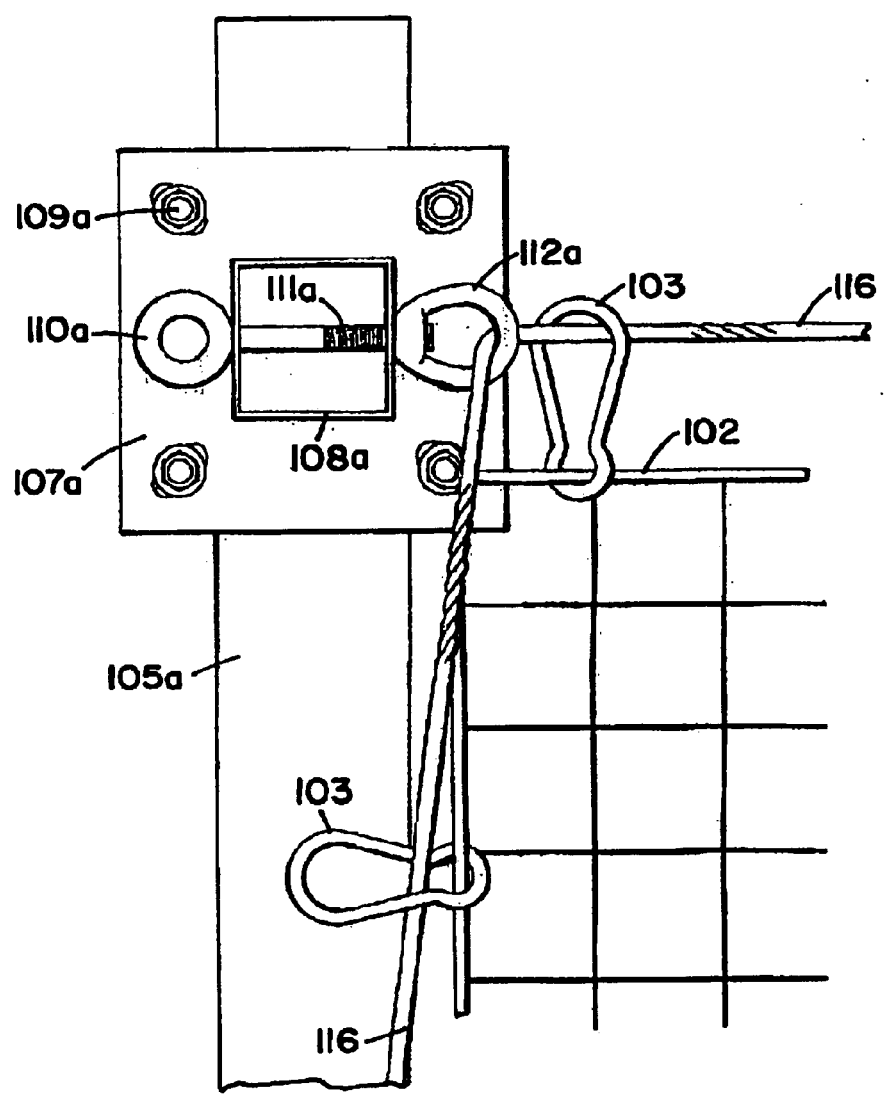
FIG. 3 is an upper left offset view of the retractable netting system shown in FIG. 2 showing a cable assembly thereof.
Figure 7:
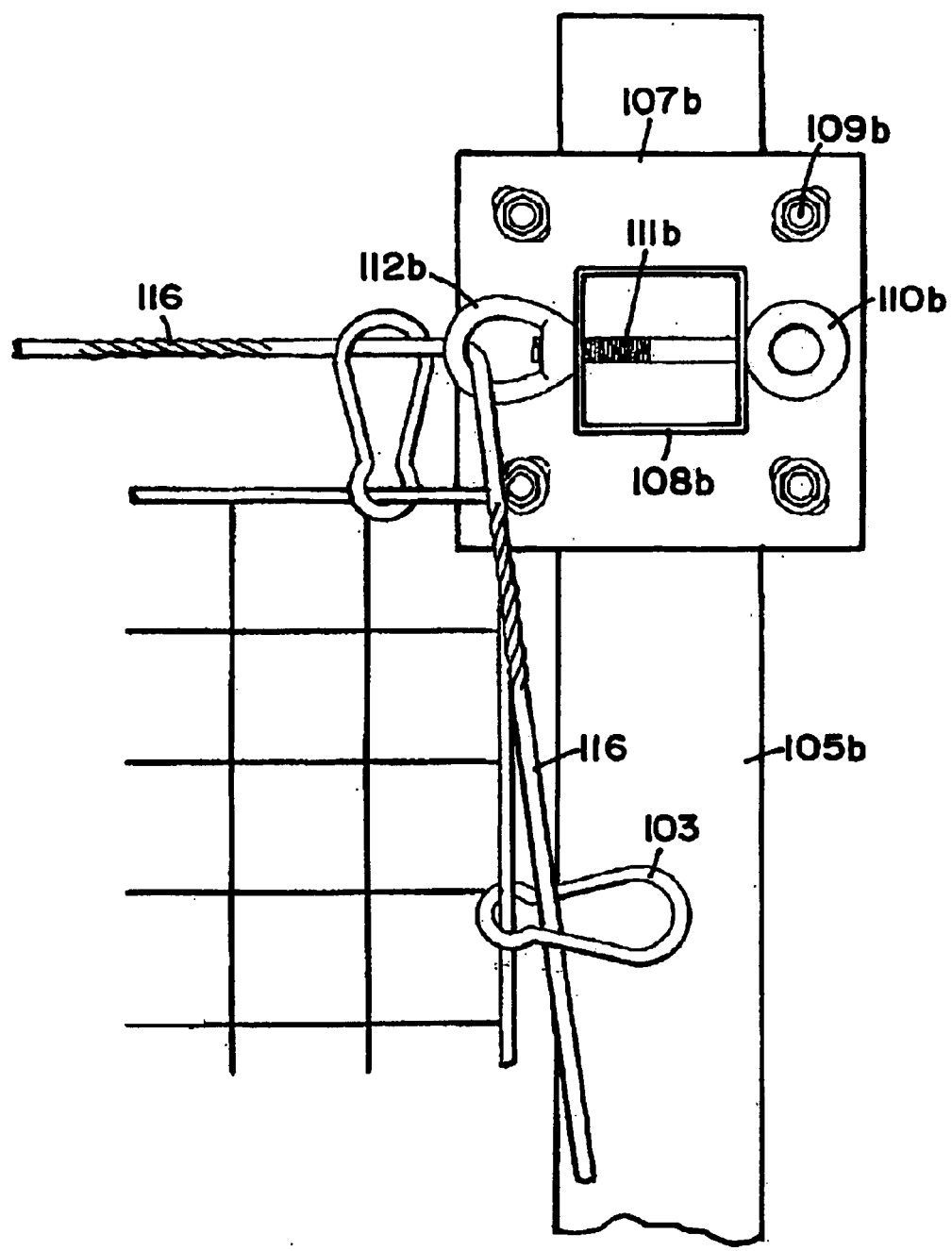
FIG. 7 is an upper right offset view of the retractable netting system shown in FIG. 6 showing a cable assembly thereof.

As shown in FIG. 3, a first eyebolt 110a having first threads 111a is inserted horizontally through opposing, cooperating apertures in the mounting surface 108a and fastened thereon with a first eye-nut 112a. As shown in FIG. 7, a second eyebolt 110b having second threads 111b is inserted horizontally through opposing, cooperating apertures in the mounting surface 108b and fastened thereon with a second eye-nut 112b. As shown in FIG. 9, a third eyebolt 110c having third threads 111c is inserted vertically through opposing, cooperating apertures in the mounting surface 108c and fastened thereon with a first washer 114c and a first hex-nut 113c. As shown in FIG. 10, a fourth eyebolt 110d having fourth threads 111d is inserted vertically through opposing, cooperating apertures in the mounting surface 108d and fastened thereon with a second washer 114d and a second hex-nut 113d. Although the preferred embodiment shows the eyebolts 110a–d arranged in specific orientations, it is recognized that the eyebolts 110a–d may be arranged in any orientation as long as the eyes are accessible.

In the preferred embodiment, a frame assembly includes a cable 116 and a draw bar member 120. The draw bar member 120 may be optional. The cable 116 extends from the lower left bracket 107c, through the upper left bracket 107a, through the upper right bracket 107b, and to the lower right bracket 107d. The cable 116 provides a partial frame onto which the netting 101 is connected with hooks 103 and onto which the netting 101 may vertically retract. More specifically, the cable 116 includes an end that is threaded through the eye of the third eyebolt 110c to form loop 118a and is fastened with cable swage 117a. The other end of the cable 116 is similarly threaded through the eye of the fourth eyebolt 110d to form loop 118b and is fastened with a cable swage 117b. Between the two ends of the cable 116, the cable 116 is threaded through the eyes in the eye-nut 112a and the eye-nut 112b.

In the preferred embodiment, as shown in FIGS. 9 and 10, the draw bar member 120 including a hook 122a on the left end and a hook 122b on the right end interconnects the left side and the right side of the partial frame formed by cable 116 thereby coordinating with cable 116 to complete the frame onto which the netting 111 is connected. The hooks 122a and 122b are preferably welded onto the draw bar member 120. The cable 116 is threaded through hook 122a on the left and through hook 122b on the right of the shelving assembly 104. Therefore, the draw bar member 120 is preferably slidably connected to the cable 116. However, because the netting 101 is slidably connected to the cable 116, it is recognized that the draw bar member 120 does not have to be connected to the cable 116.

The corresponding three sides of the netting 101 along the reinforced perimeter 102 are operatively connected to the cable 116 with hooks 103. The remaining bottom side of the netting 101 along the reinforced perimeter 102 is operatively connected to the draw bar member 120 with hooks 103. It is recognized that the draw bar member 120 is optional. The reinforced perimeter 102 of the netting 101 or other devices well known in the art may be used in lieu of the draw bar member 120.

A first pulley assembly 140a is operatively connected to the mounting surface 108a. In the preferred embodiment, the first pulley assembly 140a is welded onto the mounting surface 108a. The pulley assembly 140a includes a single pulley 141a on the outboard side and a double pulley 142a on the inboard side. The double pulley 142a includes an outer pulley 143a and an inner pulley 144a. Each pulley is a bobbin-like wheel having an indentation or groove about its periphery, and the groove is configured and arranged to guide a cable within the groove. A second pulley assembly 140b is operatively connected to the mounting surface 108b. Again, preferably the second pulley assembly 140b is welded onto the mounting surface 108b. The pulley assembly 140b includes a single pulley 141b on the inboard side and a double pulley 142b on the outboard side. The double pulley 142b includes an outer pulley 143b and an inner pulley (not shown). Rather than using a pulley assembly, it is recognized that a sheave, an eyebolt assembly, or any other suitable means known in the art may be used.

Figure 4:
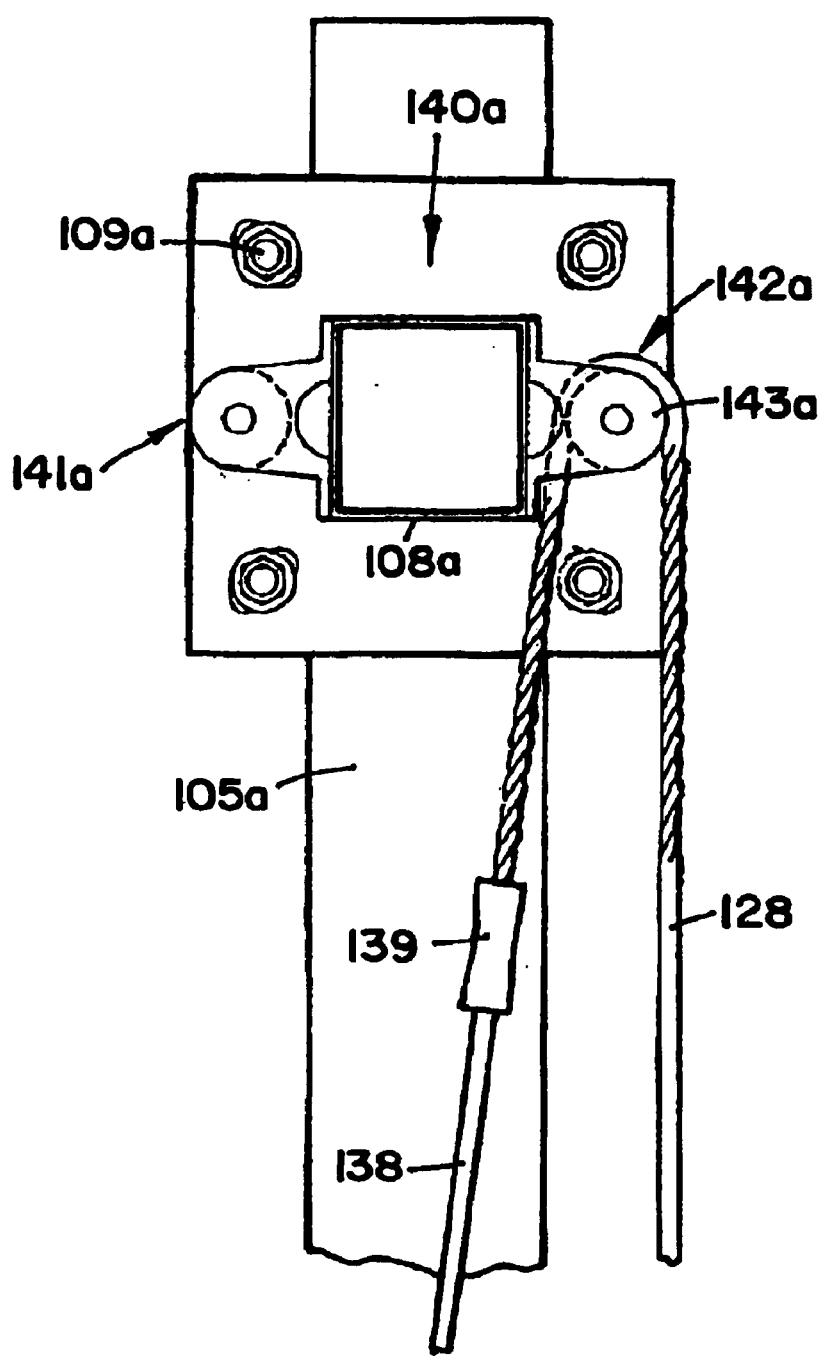
FIG. 4 is an upper left offset view of the retractable netting system shown in FIG. 2 showing another cable assembly thereof.
Figure 5:
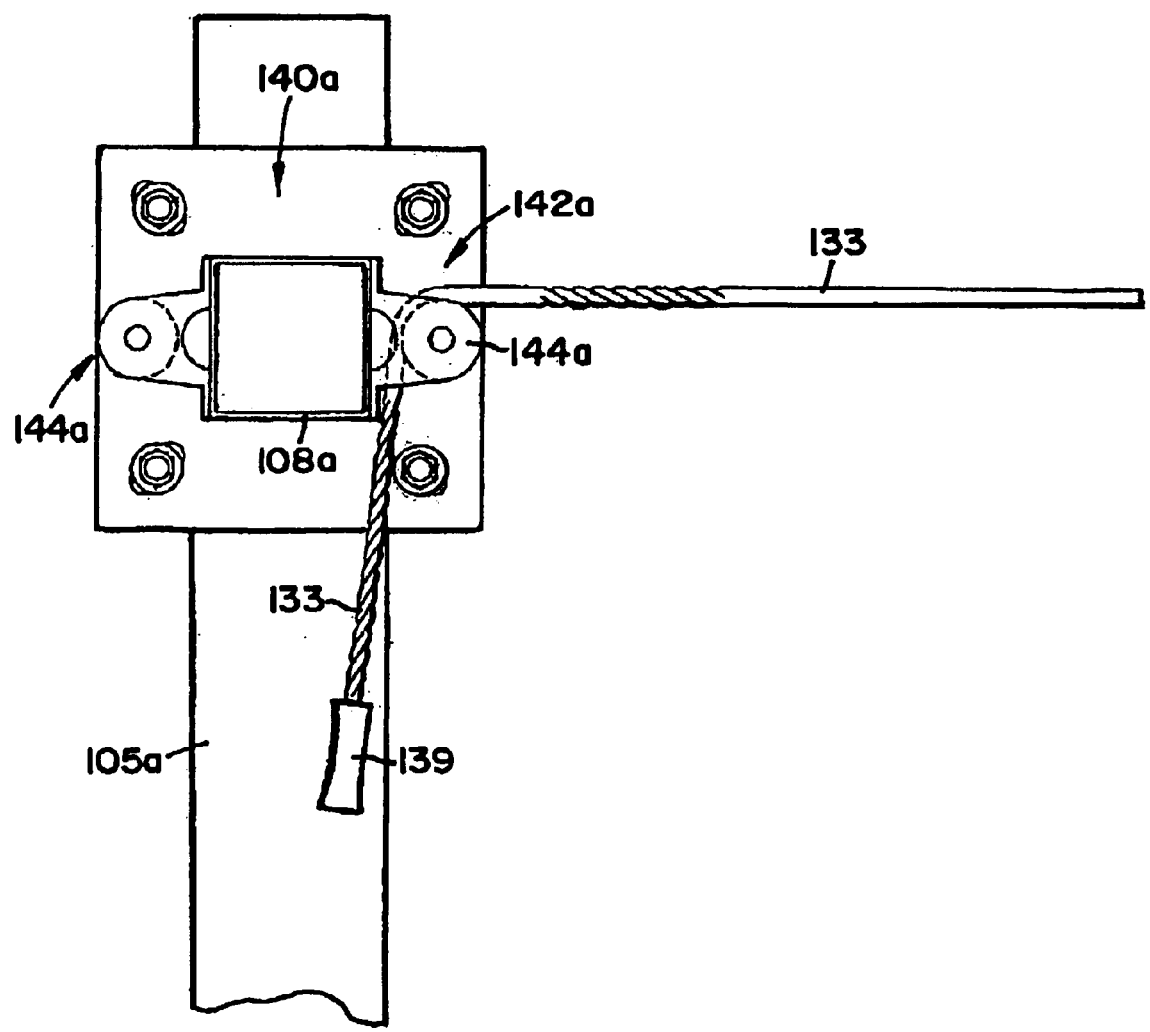
FIG. 5 is an upper left offset view of the retractable netting system shown in FIG. 2 showing another cable assembly thereof.
Figure 8:
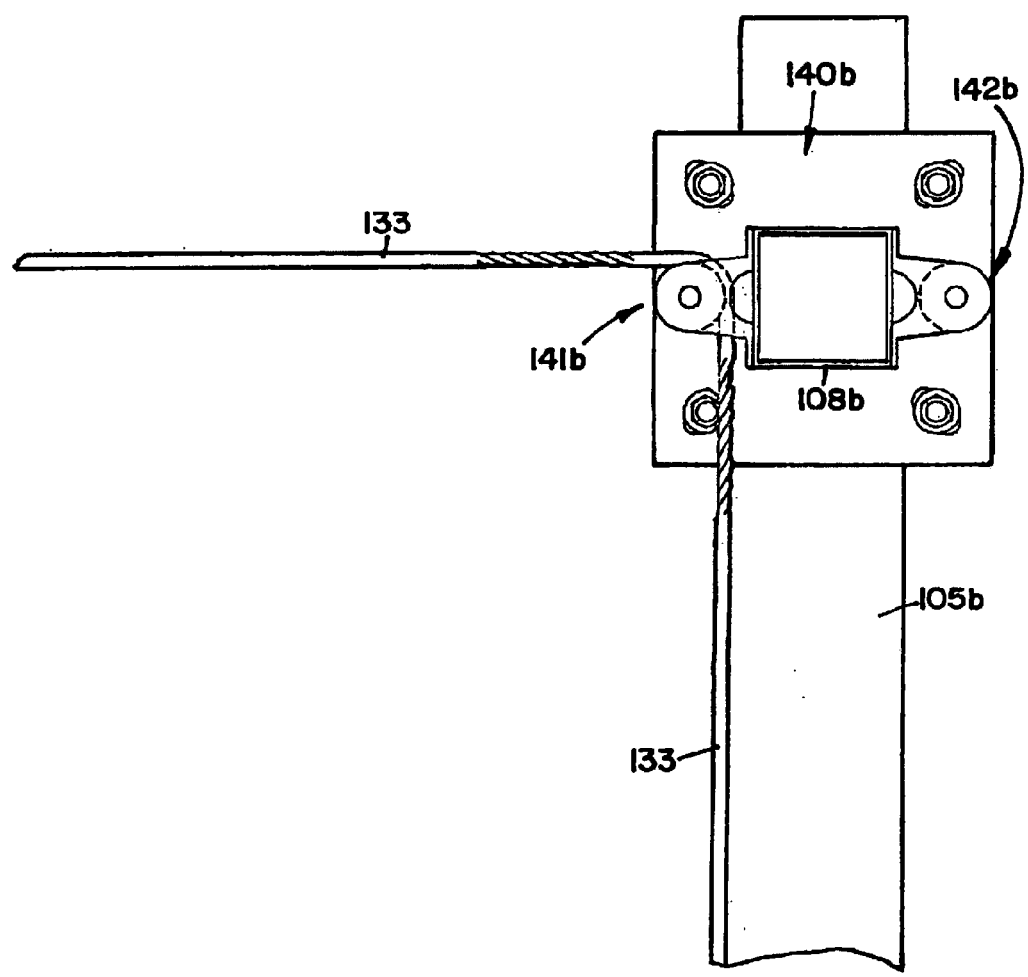
FIG. 8 is an upper right offset view of the retractable netting system shown in FIG. 6 showing a cable assembly thereof.

In the preferred embodiment, as shown in FIG. 9, an end of a left pull cable 128 is wrapped about the draw bar member 120 to form a loop 129 and is fastened onto itself with cable swage 130. The cable 128 extends upward from the cable swage 130 to the inboard side of the outer pulley 143a, which guides the cable 128 back downward on the outboard side of the outer pulley 143a to a cable swage 139, as shown in FIG. 4. As shown in FIG. 10, a right pull cable 133 is wrapped about the draw bar member 120 to form a loop 134 and is fastened onto itself with cable swage 135. The cable 133 extends upward from the cable swage 135 to the outboard side of the single pulley 141b, which guides the cable 133 to the inner pulley 144a, which guides the cable 133 downward on the outboard side of the inner pulley 144a, as shown in FIGS. 8 and 5, respectively. The cable 133 then terminates at the cable swage 139 proximate the cable 128, and a pull cable 138 extends from the opposite end of the cable swage 139. In other words, the cable swage 139 connects the left pull cable 128 and the right pull cable 133 at one end and connects the pull cable 138 at the opposite end. The pull cable 138 may be an extension of either of the cables 128 or 133 or it may be a separate cable. Preferably, the pull cable 138 is a synthetic rope material.

Alternatively, rather than utilizing left pull cable 128 and right pull cable 133, a central pull cable (not shown) may be operatively connected to either a center portion of the draw bar member 120 or the netting 101. The central pull cable would be operatively connected to at least one bracket via an eyebolt or a pulley. In other words, a single pull cable, the central pull cable, may be used. When the central pull cable is pulled, the netting 101 would be raised and when the central pull cable is released, the netting 101 would be lowered. It is recognized that any number of cables may be used to raise and lower the netting. For wide systems, at least two cables are preferably used.

In operation, the pull cable 138 is pulled and released from proximate the ground to retract and close the netting 101, respectively. As the cable 138 is pulled downward to retract the netting 101, the left pull cable 128 and the right pull cable 133 are also pulled downward proximate the outboard side of the double pulley assembly 142a. Because the left pull cable 128 is operatively connected to the left side of the draw bar member 120 and the right pull cable 133 is operatively connected to the right side of the draw bar member 120, the draw bar member 120 is pulled upward as the cable 138 is pulled downward thereby retracting the netting 101. The left pull cable 128 is guided along the grooves in the outer pulley 143a, and the right pull cable 133 is guided along the grooves in the single pulley 141b and the inner pulley 144a. Because the netting 101 is operatively connected to the draw bar member 120 with hooks 103, the netting 101 is retracted as the draw bar member 120 is pulled upward thereby allowing access to the bays 106a of the shelving assembly 104. A cleat (not shown) or other suitable device known in the art may be operatively connected to the post 105a and the pull cable 138 may be secured thereto to keep the netting 101 in a retracted position. The cable 138 is released from the ground and is pulled upward as the draw bar member 120 is lowered by the left pull cable 128 and the right pull cable 133 thereby closing the netting 101.

Another embodiment retractable netting system 200 is shown in FIG. 11. As shown in FIG. 11, the retractable netting system 200 is for use with a shelving assembly 204 having a first post 205a, a second post 205b, and shelves 206. The third and fourth posts are not shown. The four vertical posts support the shelves 206 in a horizontal orientation relative to the posts, and the shelves 206 support items stored thereon. The storage areas defined by the shelves 206 are termed bays 206a. In other words, items are stored on the shelves 206 within the bays 206a. Because of the risk that the items stored on the shelves 206 could fall and cause serious injury or even death, the netting system 200 is configured and arranged to prevent the items from falling off the shelves 206. The netting system 200 may span any or all of the four sides of the shelving assembly 204 in a vertical orientation relative to the shelving assembly 204. FIG. 11 shows the netting system 200 on one side of the shelving assembly 204, but again, it is recognized that the netting system 200 may be on any or all of the four sides of the shelving assembly 204. In addition, the netting system 200 may span any or all of the bays 206a of the shelving assembly 204. However, it is recognized that it is particularly important for the netting system 200 to span the upper bays 206a to more effectively prevent injury or death from falling items.

The netting system 200 includes netting 201 with a reinforced perimeter 202. Generally, the netting 201 is operatively connected to a cable assembly with hooks 203, and the cable assembly is operatively connected to the posts 205a and 205b. The netting system 200 also includes brackets operatively connected to the posts 205a and 205b at each corner of the netting system.

Figure 12:
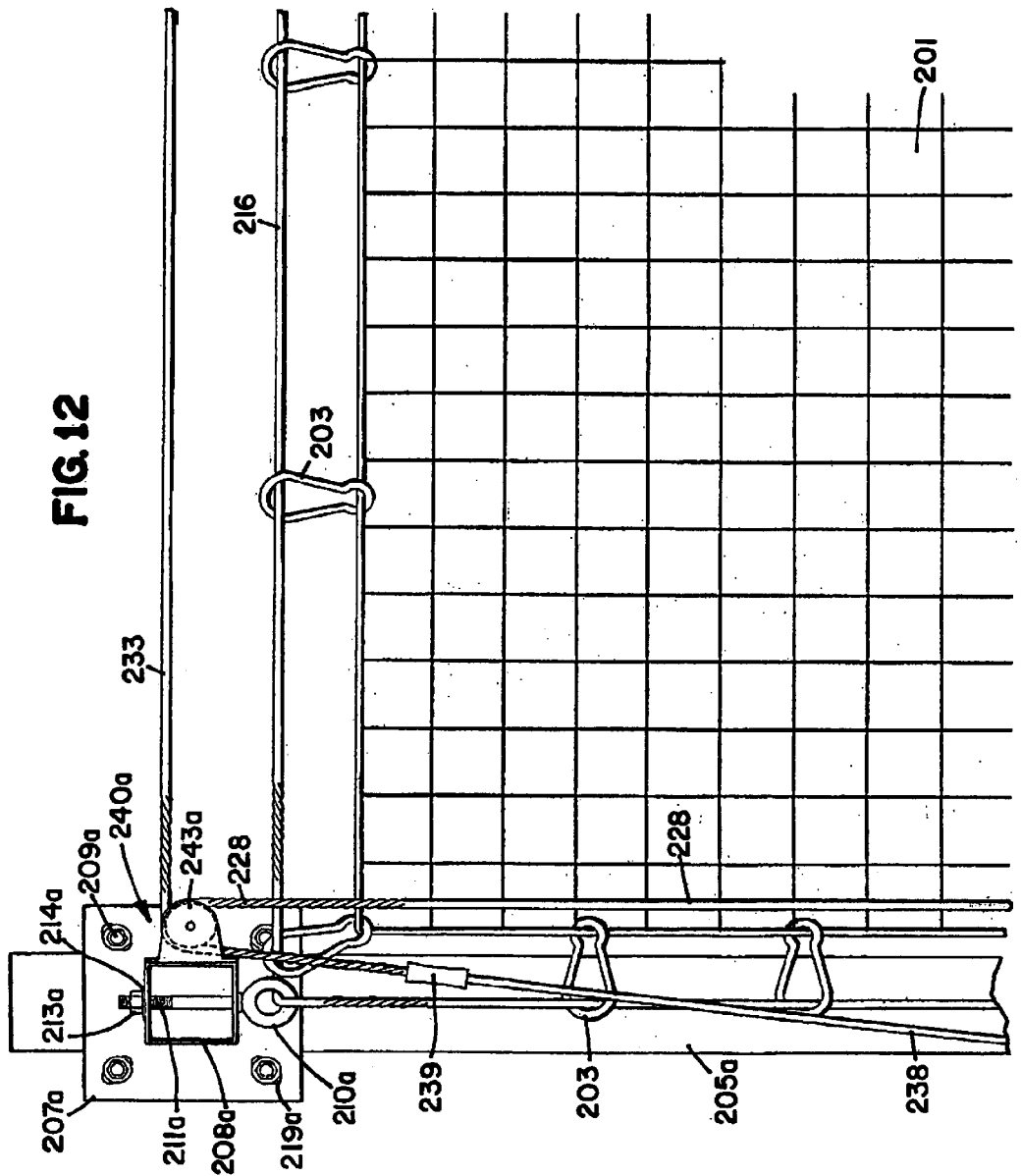
FIG. 12 is an upper left offset composite view of the retractable netting system shown in FIG. 11.
Figure 13:
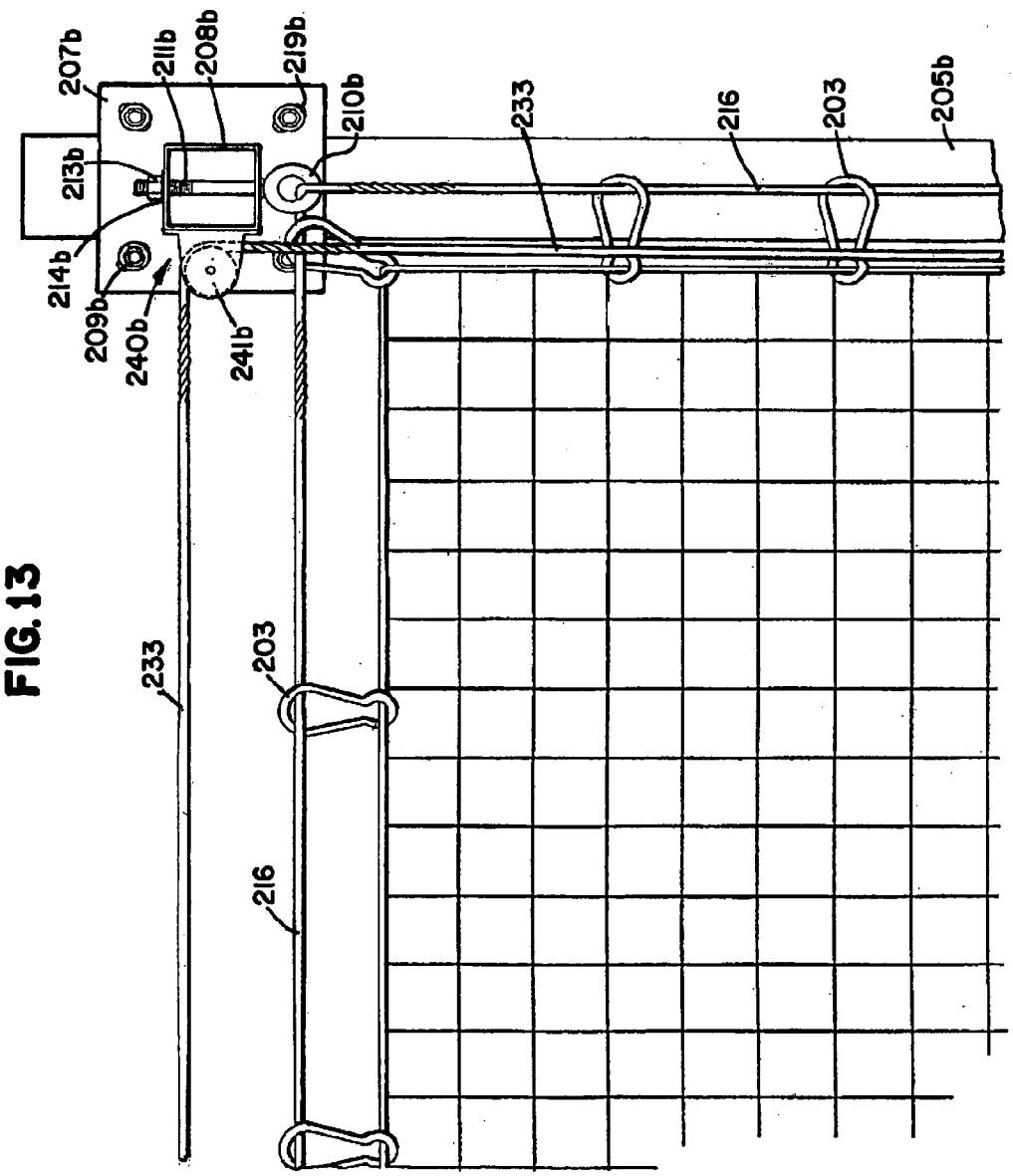
FIG. 13 is an upper right offset composite view of the retractable netting system shown in FIG. 11.
Figure 14:
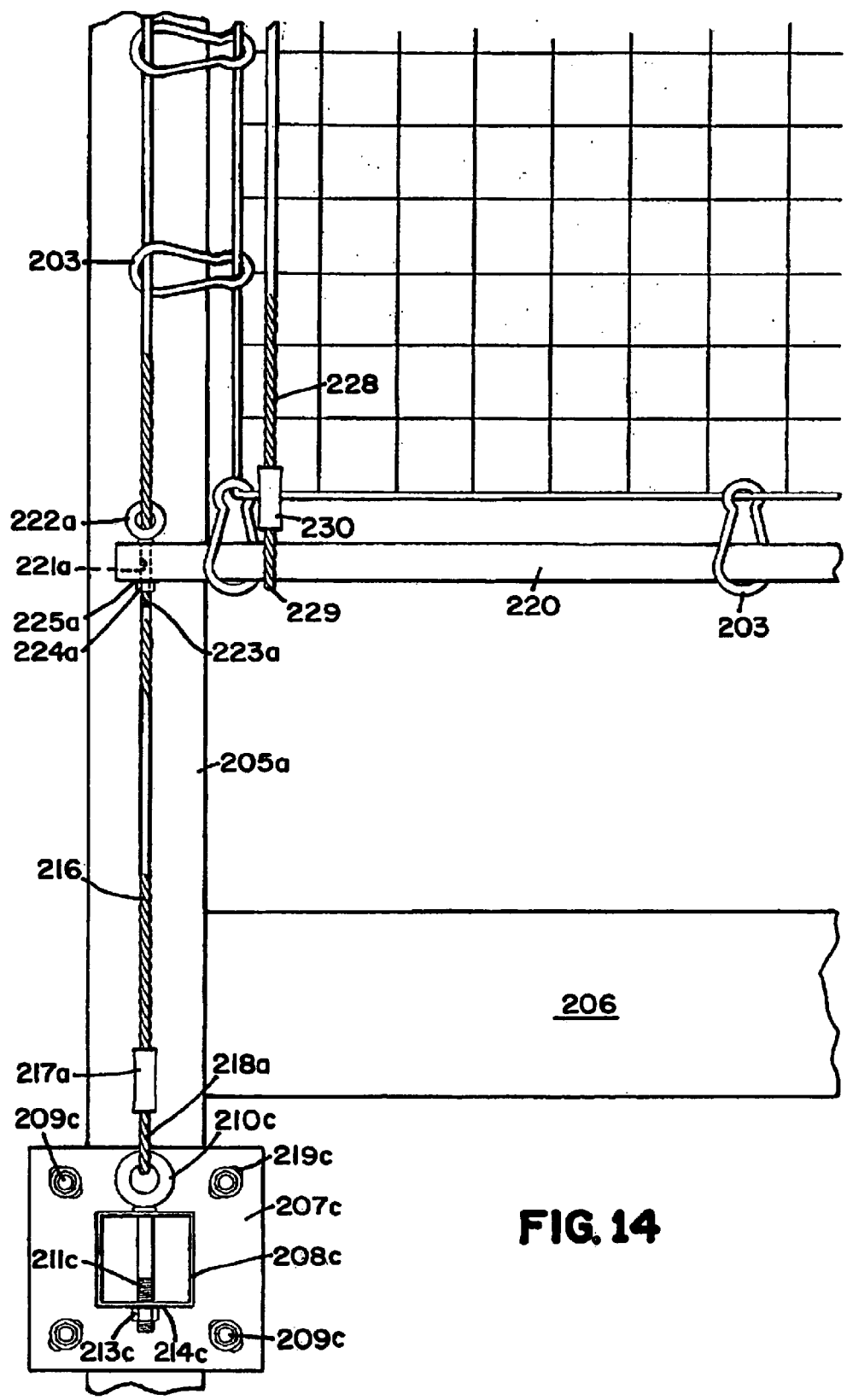
FIG. 14 is a lower left offset view of the retractable netting system shown in FIG. 11.
Figure 15:
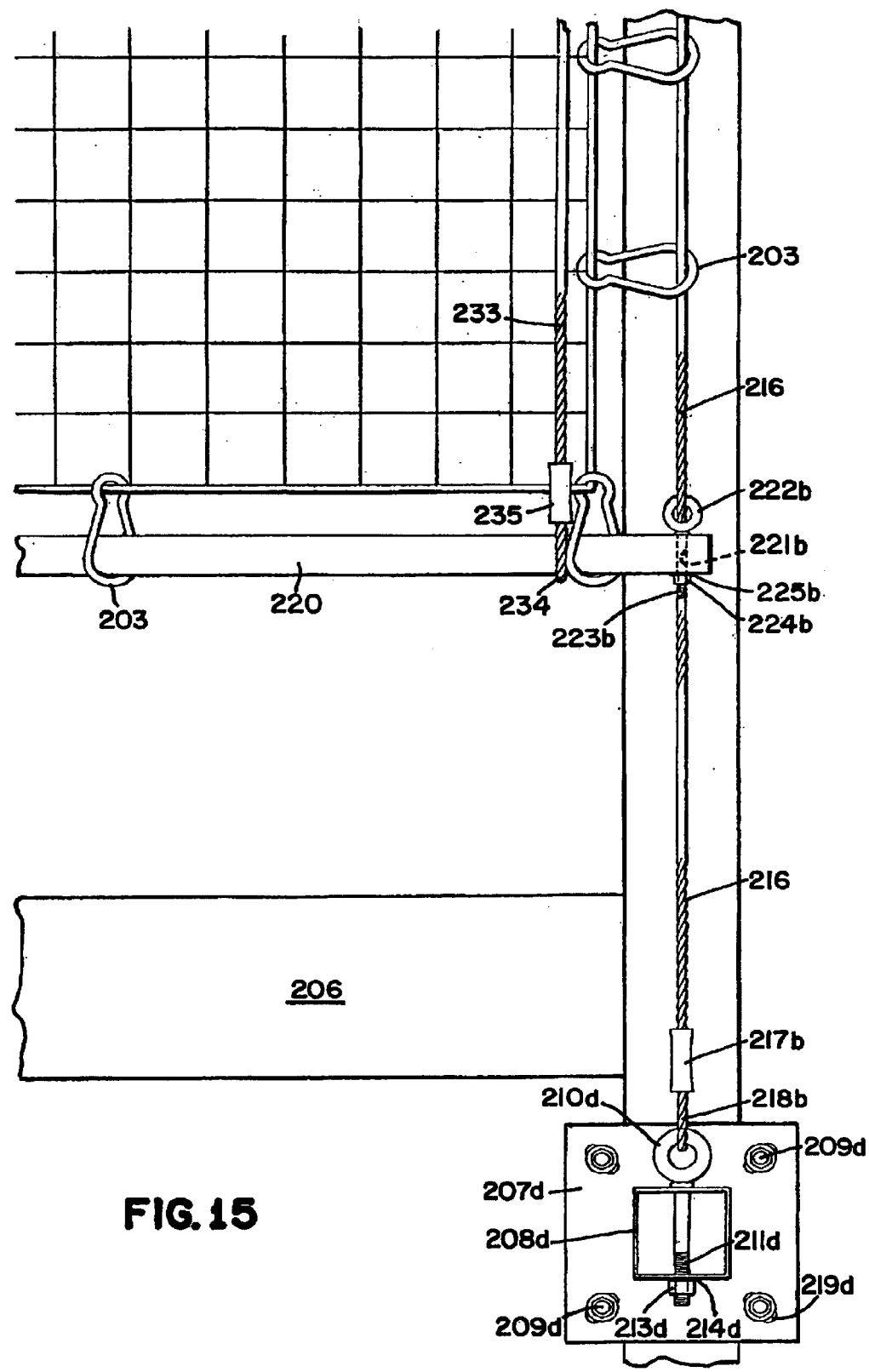
FIG. 15 is a lower left offset view of the retractable netting system shown in FIG. 11.

A first plate bracket 207a having a first mounting surface 208a is located proximate the upper left corner, as shown in FIG. 12. A second plate bracket 207b having a second mounting surface 208b is located proximate the upper right corner, as shown in FIG. 13. A third plate bracket 207c having a third mounting surface 208c is located proximate the lower left corner, as shown in FIG. 14. A fourth plate bracket 207d having a fourth mounting surface 208d is located proximate the lower right corner, as shown in FIG. 15. The brackets 207a–d include square plates with four apertures 219a–d proximate each corner and the mounting surfaces 208a–d extend proximate the middle of the plates, respectively. In the preferred embodiment, the mounting surfaces 208a–d are square tubes extending perpendicular from the plates and are welded onto the plates. The mounting surfaces 208a–d have cooperating apertures in at least one pair of opposing sides or walls. Therefore, a bolt may be inserted through the opposing, cooperating apertures parallel with the plates of the brackets 207a–d and fastened thereon with a nut. It is recognized that the mounting surfaces are not limited to being square tubes but may be cylindrical tubes, flanges, or other suitable mounting means extending from the plates.

The brackets 207a–d are connected to the posts 205a–b with U-bolts 209a–d. The U-bolts 209a–d are U-shaped and include threads at each end. A first U-bolt 209a cooperates with the post 205a proximate the top of the bracket 207a, extends around the post 205a and through the top two apertures 219a in the bracket 207a, and is fastened thereon with a washer and a hex-nut at each end. Similarly, another first U-bolt 209a cooperates with the post 205a proximate the bottom of the bracket 207a and is similarly fastened thereon. A second U-bolt 209b cooperates with the post 205b proximate the top of the bracket 207b, extends around the post 205b and through the top two apertures 219b in the bracket 207b, and is fastened thereon with a washer and a hex-nut at each end. Similarly, another second U-bolt 209b cooperates with the post 205b proximate the bottom of the bracket 207b and is similarly fastened thereon. A third U-bolt 209c cooperates with the post 205a proximate the top of the bracket 207c, extends around the post 205a and through the top two apertures 219c in the bracket 207c, and is fastened thereon with a washer and a hex-nut at each end. Similarly, another third U-bolt 209c cooperates with the post 205a proximate the bottom of the bracket 207c and is similarly fastened thereon. A fourth U-bolt 209d cooperates with the post 205b proximate the top of the bracket 207d, extends around the post 205b and through the top two apertures 219d in the bracket 207d, and is fastened thereon with a washer and a hex-nut at each end. Similarly, another fourth U-bolt 209d cooperates with the post 205b proximate the bottom of the bracket 207d and is similarly fastened thereon.

As shown in FIG. 12, a first eyebolt 210a having first threads 211a is inserted vertically through opposing, cooperating apertures in the mounting surface 208a and fastened thereon with a first washer 214a and a first hex-nut 213a. As shown in FIG. 13, a second eyebolt 210b having second threads 211b is inserted vertically through opposing, cooperating apertures in the mounting surface 208b and fastened thereon with a second washer 214b and a first hex-nut 213b. As shown in FIG. 14, a third eyebolt 210c having third threads 211c is inserted vertically through opposing, cooperating apertures in the mounting surface 208c and fastened thereon with a first washer 214c and a first hex-nut 213c. As shown in FIG. 15, a fourth eyebolt 210d having fourth threads 211d is inserted vertically through opposing, cooperating apertures in the mounting surface 208d and fastened thereon with a second washer 214d and a second hex-nut 213d. Again, although the preferred embodiment shows the eyebolts 210a–d arranged in specific orientations, it is recognized that the eyebolts 210a–d may be arranged in any orientation as long as the eyes are accessible.

In the preferred embodiment, a frame assembly includes a cable 216 and a draw bar member 220. The draw bar member 220 may be optional. The cable 216 extends from the lower left bracket 207c, through the upper left bracket 207a, through the upper right bracket 207b, and to the lower right bracket 207d. The cable 216 provides a partial frame onto which the netting 201 is connected with hooks 203 and onto which the netting 201 may vertically retract. More specifically, the cable 216 includes an end that is threaded through the eye of the third eyebolt 210c to form loop 218a and is fastened with cable swage 217a. The other end of the cable 216 is similarly threaded through the eye of the fourth eyebolt 210d to form loop 218b and is fastened with a cable swage 217b. Between the two ends of the cable 216, the cable 216 is threaded through the eyes in the eye-nut 212a and the eye-nut 212b.

In the preferred embodiment, as shown in FIGS. 14 and 15, the draw bar member 220 including an aperture 221a on the left end and an aperture 221b on the right end interconnects the left side and the right side of the partial frame formed by cable 216 thereby coordinating with cable 216 to complete the frame onto which the netting 201 is connected. The draw bar member 220 extends generally horizontally and the apertures 221a and 221b are generally vertical bores. An eyebolt 222a having threads 223a is inserted through the aperture 221a and is secured thereto with a washer 225a and a nut 224a, and an eyebolt 222b having threads 223b is inserted through the aperture 221b and is secured thereto with a washer 225b and a nut 224b. The cable 216 is threaded through the eyebolt 222a on the left and through the eyebolt 222b on the right of the shelving assembly 204. Therefore, the draw bar member 220 is preferably slidably connected to the cable 216. Alternatively, hooks could be welded onto the draw bar member 220 rather than using eyebolts 222a and 222b. However, because the netting 201 is slidably connected to the cable 216, it is recognized that the draw bar member 220 does not have to be connected to the cable 216.

The corresponding three sides of the netting 201 along the reinforced perimeter 202 are operatively connected to the cable 216 with hooks 203. The remaining bottom side of the netting 201 along the reinforced perimeter 202 is operatively connected to the draw bar member 220 with hooks 203, as shown in FIGS. 14 and 15. It is recognized that the draw bar member 220 is optional. The reinforced perimeter 202 of the netting 201 or other devices well known in the art may be used in lieu of the draw bar member 220.

A first pulley assembly 240a is operatively connected to the mounting surface 208a. In the preferred embodiment, the first pulley assembly 240a is welded onto the mounting surface 208a, however, it is recognized that other connecting means well known in the art may be used. The pulley assembly 240a is a double pulley on the inboard side and includes an outer pulley 243a and an inner pulley (not shown). Each pulley is a bobbin-like wheel having an indentation or groove about its periphery, and the groove is configured and arranged to guide a cable within the groove. A second pulley assembly 240b is operatively connected to the mounting surface 208b. Again, in the preferred embodiment, the second pulley assembly 240b is welded onto the mounting surface 208a, however, other connecting means well known in the art may be used. The pulley assembly 240b is a single pulley on the inboard side and includes a pulley 241b.

In the preferred embodiment, as shown in FIG. 14, an end of a left pull cable 228 is wrapped about the draw bar member 220 to form a loop 229 and is fastened onto itself with cable swage 230. The cable 228 extends upward from the cable swage 230 to the inboard side of the outer pulley 243a, which guides the cable 228 back downward on the outboard side of the outer pulley 243a to a cable swage 239, as shown in FIG. 12. As shown in FIG. 15, a right pull cable 233 is wrapped about the draw bar member 220 to form a loop 234 and is fastened onto itself with cable swage 235. The cable 233 extends upward from the cable swage 235 to the outboard side of the single pulley 241b, which guides the cable 233 over to the inner pulley (not shown) of the pulley assembly 240b, which guides the cable 233 downward on the outboard side of the inner pulley, as shown in FIGS. 13 and 12, respectively. The cable 233 then terminates at the cable swage 239 proximate the cable 228, and a pull cable 238 extends from the opposite end of the cable swage 239. In other words, the cable swage 239 connects the left pull cable 228 and the right pull cable 233 at one end and connects the pull cable 238 at the opposite end. The pull cable 238 may be an extension of either of the cables 228 or 233 or it may be a separate cable.

Alternatively, rather than utilizing left pull cable 228 and right pull cable 233, a central pull cable (not shown) may be operatively connected to either a center portion of the draw bar member 220 or the netting 201. The central pull cable would be operatively connected to at least one bracket via an eyebolt or a pulley. In other words, a single pull cable, the central pull cable, may be used. When the central pull cable is pulled, the netting 201 would be raised and when the central pull cable is released, the netting 201 would be lowered. It is recognized that any number of cables may be used to raise and lower the netting. For wide systems, at least two cables are preferably used.

In operation, the pull cable 238 is pulled and released from proximate the ground to retract and close the netting 201, respectively. As the cable 238 is pulled downward to retract the netting 201, the left pull cable 228 and the right pull cable 233 are also pulled downward proximate the outboard side of the first pulley assembly 240a. Because the left pull cable 228 is operatively connected to the left side of the draw bar member 220 and the right pull cable 233 is operatively connected to the right side of the draw bar member 220, the draw bar member 220 is pulled upward as the cable 238 is pulled downward thereby retracting the netting 201. The left pull cable 228 is guided along the grooves in the outer pulley 243a, and the right pull cable 233 is guided along the grooves in the single pulley 241b and the inner pulley (not shown) of the first pulley assembly 240a.

Because the netting 201 is operatively connected to the draw bar member 220 with hooks 203, the netting 201 is retracted as the draw bar member 220 is pulled upward thereby allowing access to the bays 206a of the shelving assembly 204. A cleat (not shown) or other suitable device known in the art may be operatively connected to the post 205a and the pull cable 238 may be secured thereto to keep the netting 201 in a retracted position. The cable 238 is released from the ground and is pulled upward as the draw bar member 220 is lowered by the left pull cable 228 and the right pull cable 233 thereby closing the netting 201.

Figure 16:
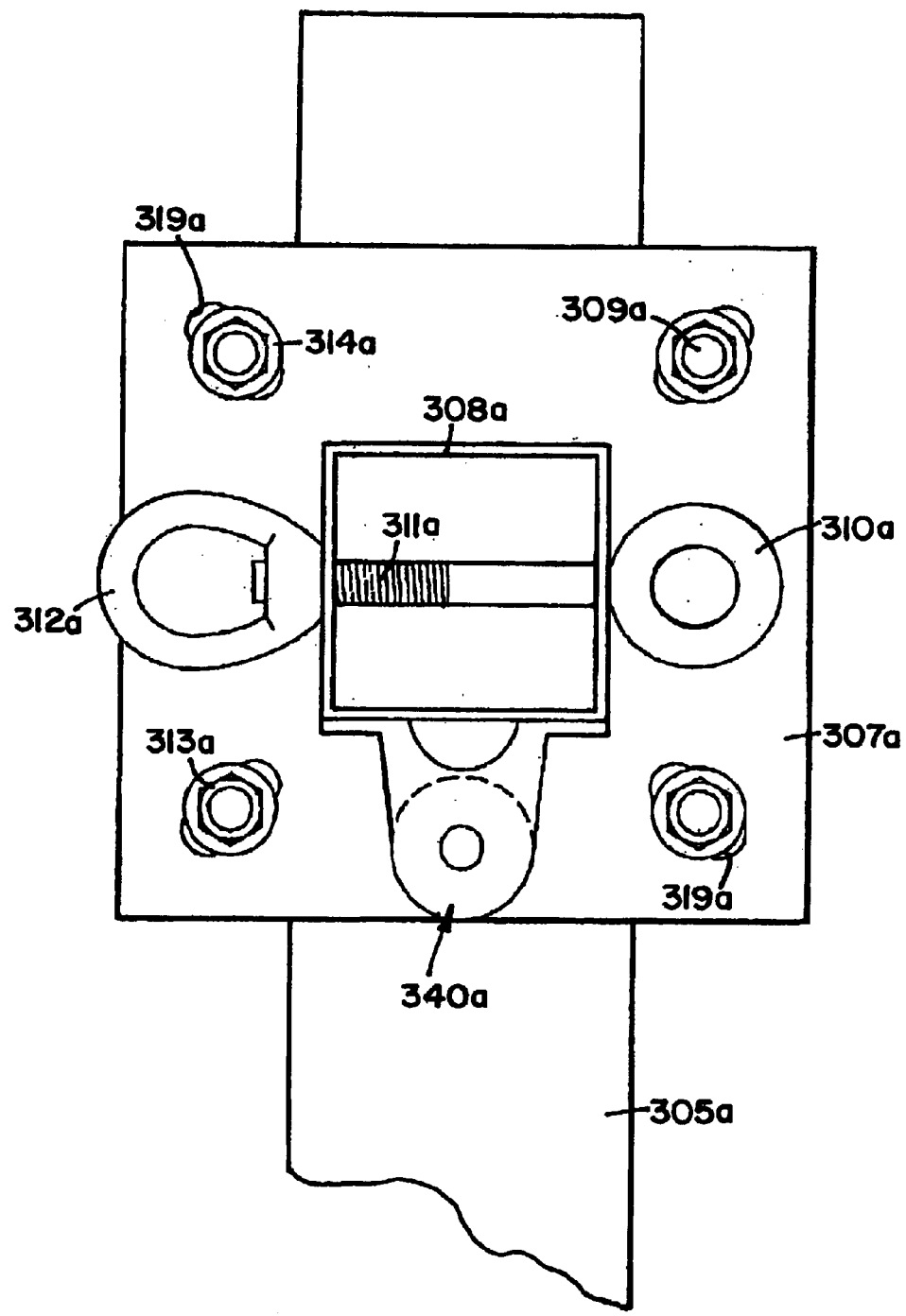
FIG. 16 is a front view of another embodiment bracket assembly for use with a shelving assembly constructed according to the principles of the present invention.

In another embodiment bracket assembly, at least one of the upper bracket assemblies may include a triple pulley assembly 340a. Although either side (or both sides) may include the triple pulley assembly 340a, the upper left bracket assembly is shown in FIGS. 16–18. The triple pulley assembly 340a is particularly useful with taller systems to reduce the amount of force required to pull the cord from the ground.

A plate bracket 307a having a mounting surface 308a is shown operatively connected to post 305a with U-bolts 309a. The plate bracket 307a is preferably square in shape and includes a slot or aperture 319a proximate each corner. The mounting surface 308a is preferably welded onto the plate bracket 307a proximate the center thereof. As shown in FIGS. 17 and 18, a U-bolt 309a cooperates with the post 305a proximate the top of the bracket 307a, extends around the post 305a and through the top two apertures 319a in the bracket 307a, and is fastened thereon with a washer 314a and a hex-nut 313a at each end. Similarly, another first U-bolt 309a cooperates with the post 305a proximate the bottom of the bracket 307a and is similarly fastened thereon. The mounting surface 308a is preferably four-sided but it is recognized that it may be round or any other suitable shape known in the art. The mounting surface 308a includes a plurality of apertures 316a along the length of the mounting surface 308a on each of the four sides, and the opposing sides have coordinating apertures 316a. An eyebolt 310a having threads 311a is inserted through a pair of coordinating apertures 316a and fastened thereon with an eye-nut 312a. An end cap 315a may be operatively connected to the end of the mounting surface 308a opposite the end welded to the bracket 307a. A triple pulley assembly 340a is welded onto the bottom side of the mounting surface 308a and includes an outer pulley 341a, a middle pulley 342a, and in inner pulley 343a. The triple pulley assembly 340a may be operatively connected to any of the mounting surface sides.

Although not shown, a left cable operatively connected to a left end of a draw bar member extends upward to the inboard side of the triple pulley assembly 340a and is placed within the groove of one of the pulleys, which guides the left cable downward on the outboard side of the pulley. The left cable then is placed within the groove of a pulley (not shown) located proximate the bottom of the shelving assembly and extends upward on the inboard side of the pulley. The left cable extends upward and is placed within the groove of another pulley of the triple pulley assembly 340a and is placed within the groove of the pulley, which guides the left cable downward on the outboard side of the pulley. The left cable terminates at a cable swage proximate a right cable from the right side of the assembly, and a pull cable extends from the opposite end of the cable swage. In other words, the cable swage connects the left cable and the right cable at one end and connects the pull cable at the opposite end. The pull cable may be an extension of either the left or right cable or it may be a separate cable. It does not matter which of the three pulleys is utilized for the left cable. The right side of the assembly is similarly configured and arranged as the previously described embodiments. It is recognized that the pull cable may be located on either the left side, as described, or the right side of the assembly. The eyebolt 310*a* and the eye-nut 312*a* may be utilized to operatively connect the cable onto which the netting is connected as the previously described embodiments.

In operation, the pull cable is pulled from the floor and the left cable is drawn from the triple pulley assembly proximate the top, the pulley proximate the bottom, and the triple pulley assembly proximate the top. The additional pulley used proximate the top and the additional pulley used proximate the bottom help reduce the amount of force required to pull the cord from the ground.

In addition, it is possible to provide extension booms (not shown) to extend the posts of the shelving assembly upward. The present invention may be used in conjunction with the extension booms thereby extending the height of the netting system above the height of the shelving assembly. The netting system would then span an area above the shelving assembly to prevent items from falling off the top shelf of the shelving assembly. An example of how the extension booms may be used is disclosed in U.S. patent application Ser. No. 10/072,608, filed Feb. 7, 2002, entitled Net Anchorage Methods and Apparatus, and U.S. patent application Ser. No. 10/072,314, filed Feb. 7, 2002, entitled Net Anchorage Methods and Apparatus, which are incorporated by reference herein.

Preferably, the netting is made with shock-absorbent, flexible nylon. In addition, the netting can be treated with a fire retardant. The hardware components are preferably galvanized.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A retractable netting system for use with a shelving assembly, comprising:
   a) a plurality of vertical shelf posts and horizontal shelf supports configured and arranged to define at least one bay;
   b) a net configured and arranged to span the at least one bay;
   c) a plurality of brackets operatively connected to at least two of plurality of vertical shelf posts;
   d) a frame assembly including a first cable and a draw bar member, the first cable operatively connected to the plurality of brackets, the draw bar member being slidably connected to the first cable, the net being operatively connected to the first cable and the raw bar member, a bottom portion of the net being operatively connected to the draw bar member;
   e) a second cable operatively connected to a first end of the draw member and at least one bracket;
   f) a third cable operatively connected to a second end of the draw bar member and at least one bracket; and
   g) a pull cable operatively connected to the second cable and the third cable, wherein pulling the pull cable raises the draw bar member thereby raising the net and easing the pull cable lowers the draw bar member thereby lowering the net.

2. The retractable netting system of claim 1, wherein the net spans an area above the shelving assembly.

3. The retractable netting system of claim 1, wherein the second cable and the third cable are operatively connected to the at least one bracket with a pulley assembly.

4. The retractable netting system of claim 3, wherein the pulley assembly includes a double pulley.

5. A storage assembly, comprising:
   a) a plurality of vertical shelf posts and horizontal shelf supports configured and arranged to define at least one shelf space having a length measured perpendicular to said shelf posts;
   b) a side having a post at each end, said each post having a top and a bottom;
   c) a net sized to span said shelf length, said net having four sides;
   d) a bracket operatively connected to said each post on said side proximate said top and proximate said bottom of said each post;
   e) a first cable operatively connected to each bracket and interconnecting said brackets, said first cable defining a tree-sided frame onto which three sides of the net are operatively connected;
   f) a draw bar member slidably connected to said first cable, said fourth side of said net being operatively connected to said draw bar member;
   g) a second cable operatively connected to a first end of the draw bar member and at least one bracket;
   h) a third cable operatively connected to a second end of the draw bar member and at least one bracket; and
   i) a pull cable interconnecting the second cable and the third cable, wherein pulling the pull cable raises the draw bar member and releasing the pull cable lowers draw bar member thereby raising and lowering the net.

6. The storage assembly of claim 5, wherein the net spans an area above the shelving assembly.

7. The storage assembly of claim 5, wherein the second cable and the third cable are operatively connected to the at least one bracket with eyebolts.

8. The storage assembly of claim 5, wherein the second cable and the third cable are operatively connected to the at least one bracket with a pulley assembly.

9. The storage assembly of claim 8, wherein the pulley assembly includes a double pulley.

10. The storage assembly of claim 8, wherein the pulley assembly includes a triple pulley.

11. The storage assembly of claim 10, wherein the pulley assembly further includes a single pulley.

12. A retractable netting system for use with a shelving assembly, comprising:
   a) a plurality of vertical shelf posts and horizontal shelf supports configured and arranged to define at least one bay and at least one side, each post having a top and a bottom;
   b) a net configured and arranged to span the at least one bay;
   c) a first bracket operatively connected to each post on the at least one side proximate the top of each post;
   d) a second bracket operatively connected to each post on the at least one side a distance from said first bracket;
   e) a frame assembly operatively connected to the posts on the at least one side;
   f) a first cable operatively connected to the frame assembly proximate a first side, the first cable being operatively connected to the first bracket on the first side of the frame assembly; and g) a second cable operatively connected to the frame assembly proximate a second side, the second cable being operatively connected to the first bracket on the second side of the frame assembly.

13. The retractable netting system of claim 12, wherein the second cable is further operatively connected to the first bracket on the first side of the frame assembly.

14. The retractable netting system of claim 12, further comprising a pull cable interconnecting said first cable and said second cable, wherein pulling the pull cable raises the net and releasing the pull cable lowers the net.

15. The retractable netting system of claim 12, further comprising a pulley assembly operatively connected to the first brackets, wherein the first cable and the second cable are operatively connected to the first brackets with the pulley assembly.

16. The retractable netting system of claim 15, wherein the pulley assembly includes a double pulley.

17. The retractable netting system of claim 12, wherein the frame assembly includes a third cable and a draw bar member, the third cable being operatively connected to each bracket and interconnecting the brackets, the draw bar member being slidably connected to the third cable, a bottom portion of the net being operatively connected to the draw bar member, the first cable and the second cable each being operatively connected to opposing ends of the draw bar member.

18. The retractable netting system of claim 12, wherein the net spans an area above the shelving assembly.

19. A retractable netting system for use with a shelving assembly, comprising:

a) a plurality of vertical shelf posts and horizontal shelf supports configured and arranged to define at least one bay;

b) a net configured and arranged to span the at least one bay;

c) a plurality of brackets operatively connected to at least two of plurality of vertical shelf posts;

d) a frame assembly including a first cable operatively connected to the plurality of brackets, the net being operatively connected to the first cable; and e) a second cable operatively connected to the net and at least one bracket, wherein pulling the second cable raises the net and releasing the second cable lowers the net.

20. The retractable netting system of claim 19, the frame assembly further including a draw bar member, a bottom portion of the net being operatively connected to the draw bar member, the second cable being operatively connected to the draw bar member.

21. The retractable netting system of claim 20, wherein the draw bar member is slidably connected to the first cable.

22. The retractable netting system of claim 19, further comprising third cable operatively connected to a first end of the net and at least one bracket, the second cable being operatively connected to a second end of the net.

23. The retractable netting system of claim 22, further comprising pull cable operatively connected to the second cable and the third cable, wherein pulling pull cable raises the net and releasing the pull cable lowers the net.

24. The retractable netting system of claim 23, the frame assembly further including a draw bar member, a bottom portion of the net being operatively connected to the draw bar member, the second cable being operatively connected to the draw bar member.

25. The retractable netting system of claim 24, wherein the draw member is slidably connected to the first cable.

* * * * *

UNITED STATES PATENT AND TRADEMARK OFFICE
CERTIFICATE OF CORRECTION

PATENT NO. : 6,938,785 B2
DATED : September 6, 2005
INVENTOR(S) : Denny et al.

It is certified that error appears in the above-identified patent and that said Letters Patent is hereby corrected as shown below:

Title page,
Item [73], Assignee, delete "Sinco, Inc." and insert therefor -- SINCO, Inc. --.

Column 5,
Line 20, delete "111" and insert therefor -- 101 --.

Column 11,
Line 48, "of plurality" should read -- of the plurality --.
Line 53, delete "raw" and insert therefor -- draw --.
Line 62, delete "easing" and insert therefor -- releasing --.

Column 12,
Line 20, delete "tree" and insert therefor -- three --.

Column 14,
Line 25, "pulling pull" should read -- pulling the pull --.

Signed and Sealed this

Twenty-second Day of November, 2005

JON W. DUDAS
*Director of the United States Patent and Trademark Office*